Aug. 28, 1962 H. T. H. A. BERGMAN 3,051,375
METHOD OF AND A DEVICE FOR PUNCHING STATISTICAL CARDS
Filed July 29, 1957 5 Sheets-Sheet 1

INVENTOR
Hugo T. H. A. Bergman
BY Sommers & Young
ATTORNEYS

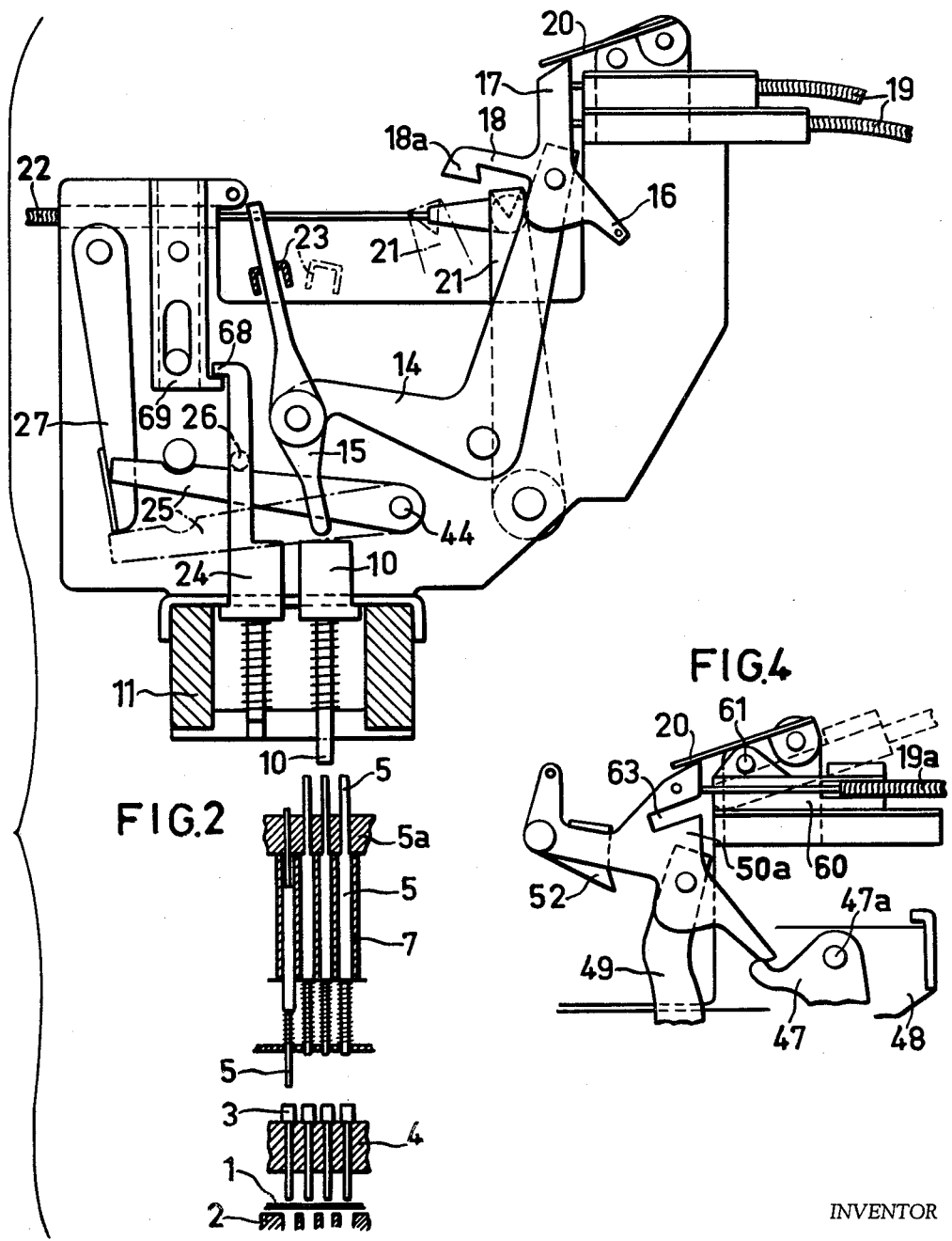

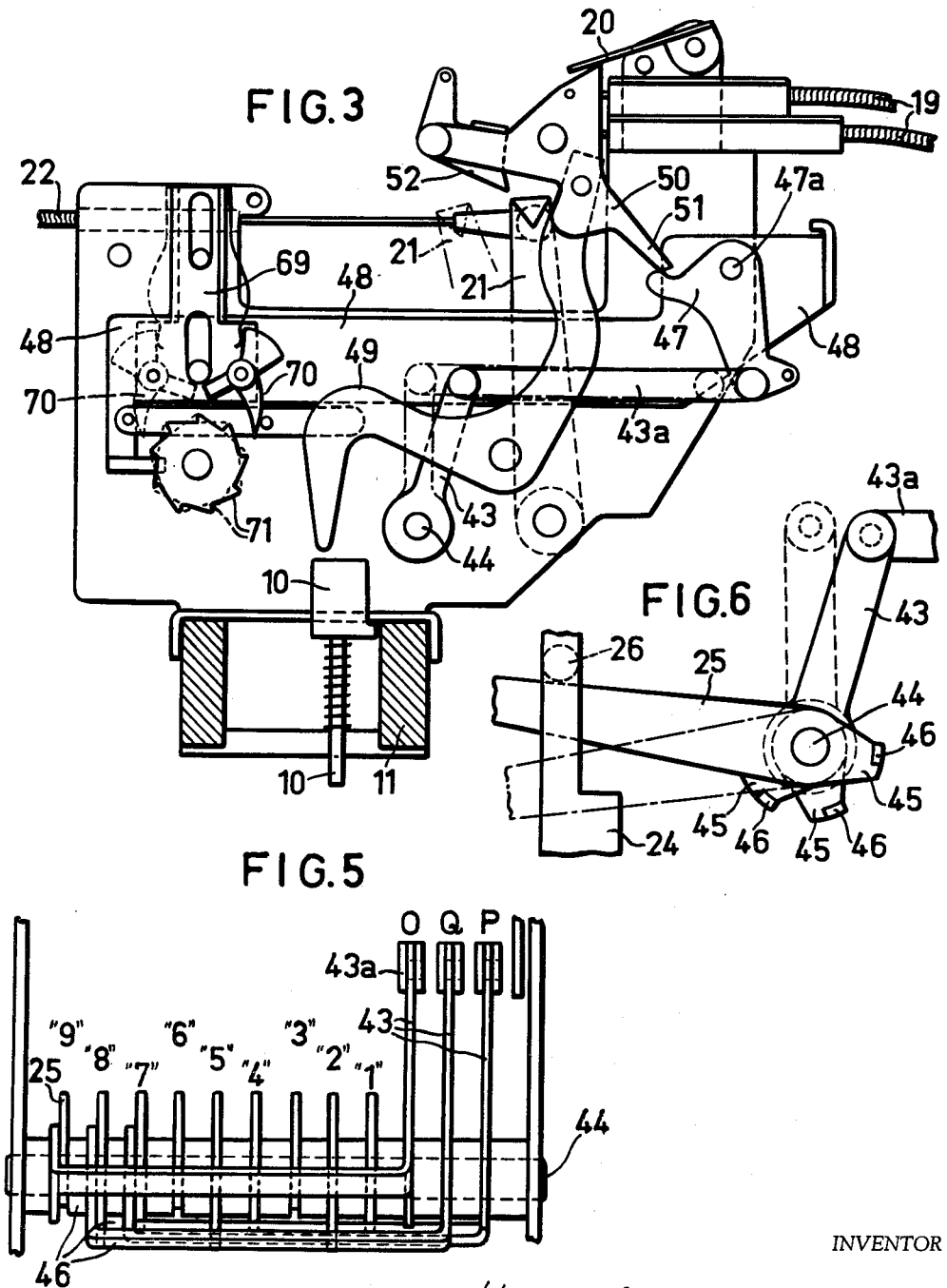

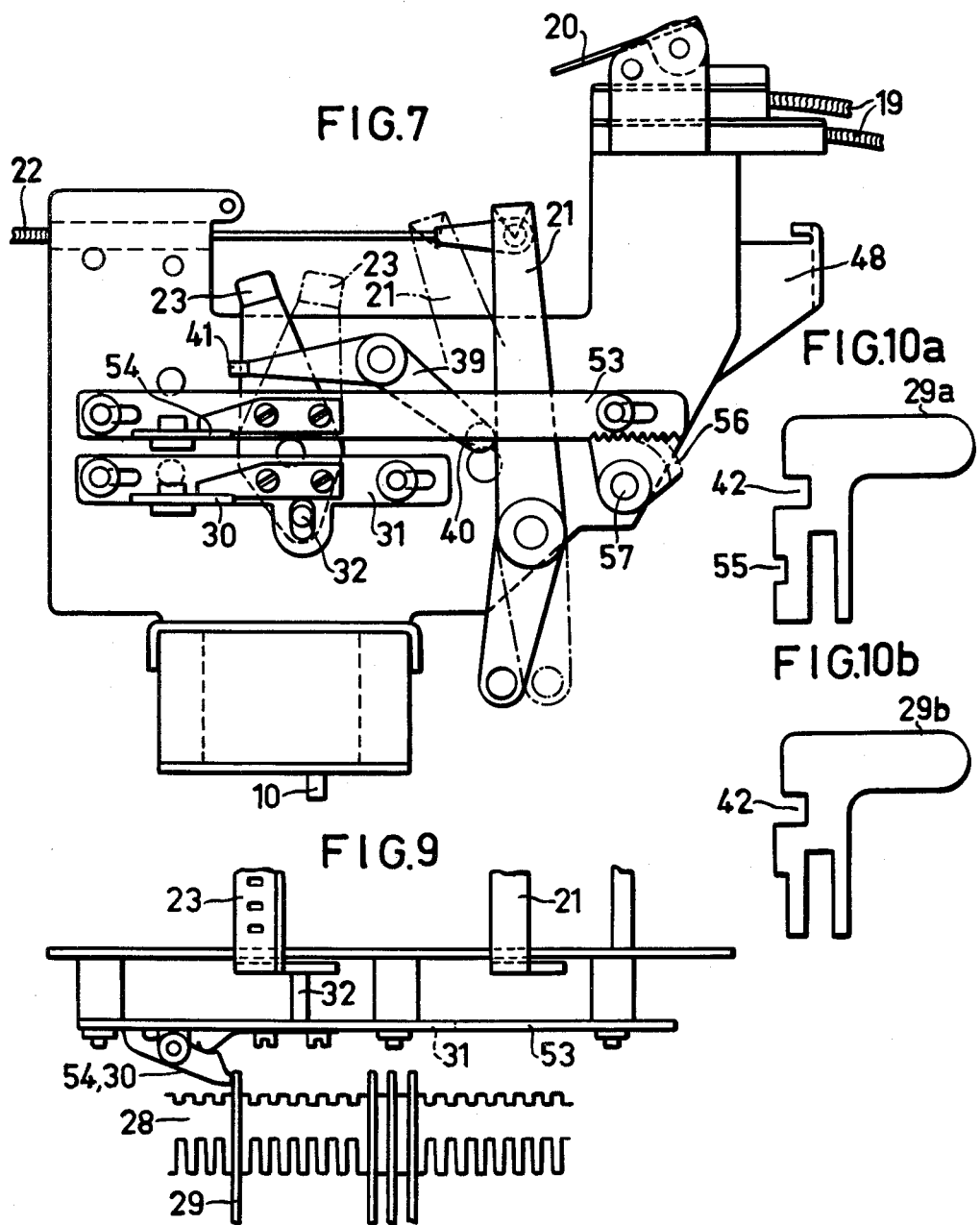

Aug. 28, 1962     H. T. H. A. BERGMAN     3,051,375
METHOD OF AND A DEVICE FOR PUNCHING STATISTICAL CARDS
Filed July 29, 1957            5 Sheets-Sheet 5
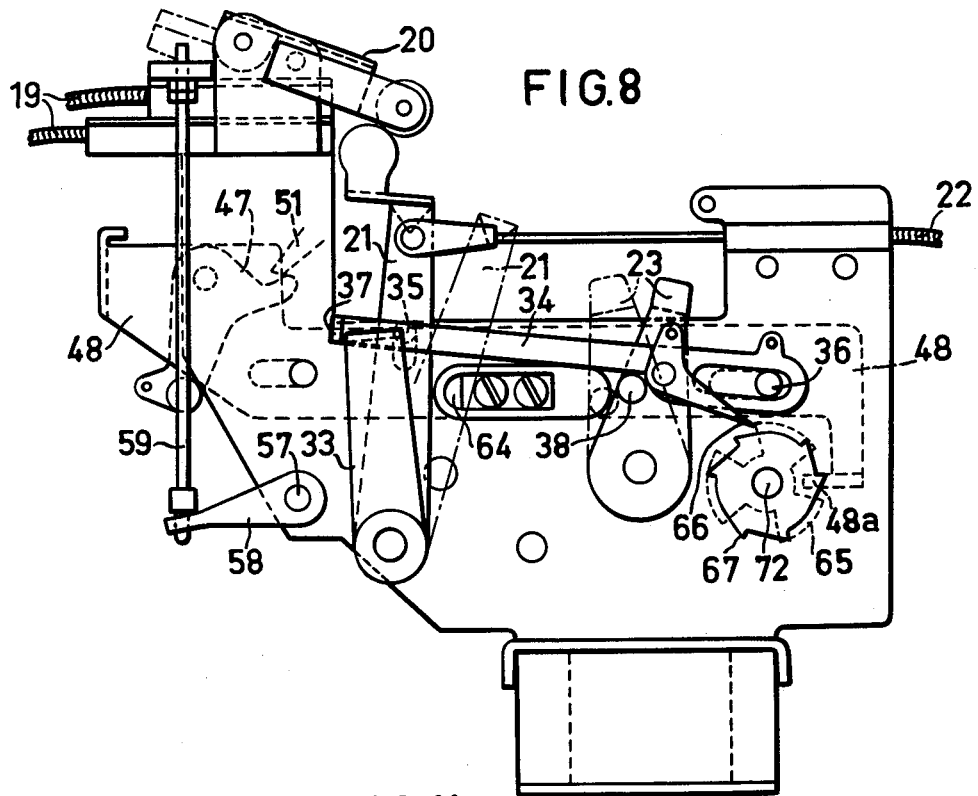
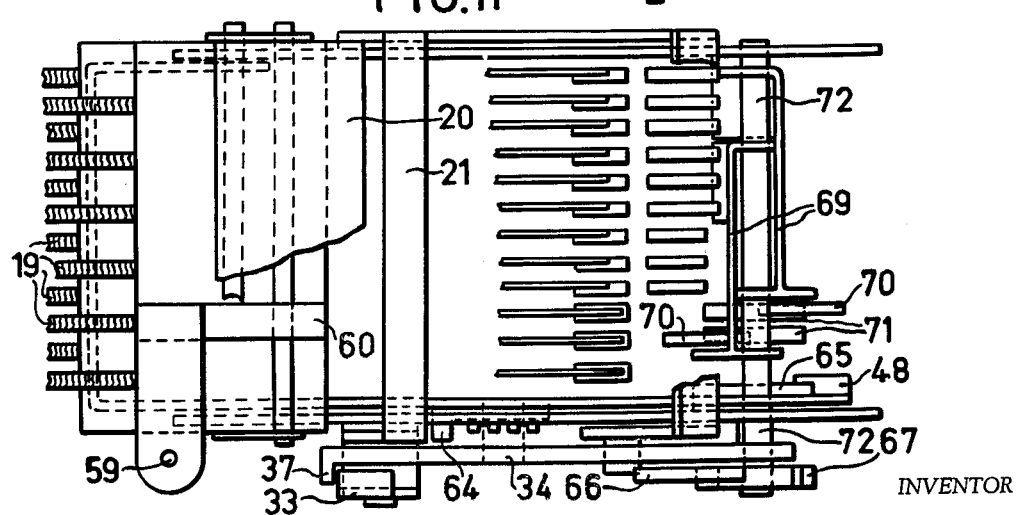
INVENTOR
Hugo T. H. A. Bergman
BY Sommers + Young
ATTORNEYS

United States Patent Office 3,051,375
Patented Aug. 28, 1962

3,051,375
METHOD OF AND A DEVICE FOR PUNCHING STATISTICAL CARDS
Hugo Teodore Hjalmar Axel Bergman, Jonkoping, Sweden, assignor to Jönköpings och Vulcans Tändsticksfabriks Aktiebolag, Jonkoping, Sweden, a Swedish joint-stock company
Filed July 29, 1957, Ser. No. 674,964
Claims priority, application Sweden Aug. 2, 1956
6 Claims. (Cl. 234—91)

Statistical cards, more commonly called punched cards, which are used for mechanized book-keeping and statistical work and as means for input and output for mechanical or electronic computers are, as a rule, divided into vertical columns. In each column the figures 0–9 can be represented by punching a hole in a certain position. Generally there is space for two additional punchings to be used for so called overpunching.

Such a column may have this appearance:

P
Q
0
1
2
3
4
5
6
7
8
9 where P and Q indicate the position for overpunchings.

The figure 0 can be represented through the lack of holes. In such a case a hole in the position P may denote the value 10, in the position Q the value 20, and in the position 0 the value 30. In this way it is possible to denote in one single column all values from and including 0 to 39. This is, at the same time, the principle for codifying all the letters of the alphabet or the so called alphabetical punching.

The mentioned method is widely used for denoting day or month or any quantity, the total number of units of which does not exceed 39. Correspondingly the date 12/30 may be denoted in two columns only. It is evident that the increased capacity attained through overpunchings is especially important in connection with small cards containing only a reduced number of vertical columns.

The use of overpunching can be extended further in various ways, for instance as is shown by the following diagram:

| 10 | 40 | (70) |
|---|---|---|
| 20 | 50 | 80 |
| 30 | 60 | 90 |
| 1 | 1 | 1 |
| 2 | 2 | 2 |
| 3 | (3) | 3 |
| 4 | 4 | 4 |
| 5 | 5 | 5 |
| (6) | 6 | 6 |
| 7 | 7 | 7 |
| 8 | 8 | 8 |
| 9 | 9 | (9) |

By means of punchings in the positions marked by brackets the four figures 7639 are denoted using three columns only. In this way one entire column containing nine figures, has been made superfluous or, rather, placed horizontally on top of a group of three columns containing the number of hundreds, tens, and units. It is possible to extend this principle still further so that additional powers of 10 can be denoted in a correspondingly reduced number of columns. It is to be noted that a nought is represented by the absence of punching and, which is of especial importance in connection with the invention, that the marking of higher thousands than 3000 is displaced laterally to other columns.

Although the abovementioned way of using overpunchings is well known and widely used its application with hitherto known appliances in some cases, specified in the following, is difficult or even impossible. By the invention the use of overpunchings is more generally applicable.

The manual punching of combinations, consisting of not more than two holes, such as used for alphabetical punching or for quantities and code numbers comprising not more than 39 units, viz. day, month, shillings, pence, etc., does not present any special difficulty. If, however, an overpunching is to be located not in the column in which the punching or the locking of punches is actually taking place but in another column, the procedure is much more difficult. In addition, with hitherto known methods for manual operation the punching according to the so called 1—2—4—7 system is entirely impossible. This is also the case as regards the serial-binary system, much used for computers. These machines work with great speed, but their use is severely obstructed by the existing difficulties to translate speedily and simply the data to be computed. Punched cards are very suitable as carriers for this data especially if they are punched according to the serial-binary system. There exists, unfortunately, great difficulties in the transferring of the data contained in the original documents to punched cards, adapted for the computer.

With mechanical punching of cards by means of a machine, governed by an indicator such as a perforated tape, or a magnetic tape, the difficulties mentioned above are still more pronounced. Such a tape carries signals which are sensed in sequence, one after the other, and thereby actuate the punching mechanism. A date, as for instance 12/30, is carried by the tape by means of the signals or combinations for the figures 1, 2, 3 and 0, which signals are sensed and actuate the machine in the mentioned order. In order to utilize fully the possibility of increasing the capacity of the punched card by means of overpunching the figures 1 and 2 (the month) must be punched in one column and the figures 3 and 0 (the day) both in the following column, otherwise four columns will have to be used for carrying the complete date.

The difficulty is caused by the fact that the code systems for such indicators as perforated tapes and similar devices which are in general use do not comprise signals or combinations for such cases when overpunchings are indicated and can be used. This is especially the case as regards the international code for teleprinter communications.

A perforated tape may be produced by means of a perforating typewriter. When a document is typed on such a machine its contents are duplicated entirely or partly in the form of perforations in a tape. This tape may be used for actuating an automatic typewriter or a so called tape-to-card punch for the mechanical punching of cards. Thereafter the cards are sorted, computed, and tabulated as usual. An important feature of this method is, that the slowest and most costly operations in connection with punched cards, viz. punching, are performed by a tape controlled card punching machine with a great speed and, furthermore, with such an accuracy that the hitherto required correction of errors in punching practically can be dispensed with.

In this way international teleprinter communications may be utilized for the transfer of such contents of the original document which ought to be further treated by a punched card equipment. This means, in fact, a remote punching of cards. It is not indispensable to use a perforated tape as an intermediate control medium. Thus the electrical impulses which otherwise would perform the perforation of the tape may be brought to actuate the card punching mechanism directly. However, if the international teleprinter communications should be utilized, the advantage would be limited by the fact that the international teleprinter code is composed of only 5 holes or channels. Special hole combinations or signals for overpunching are lacking, and the system thus cannot be used for increasing the capacity of the cards.

This disadvantage is removed by the present invention, which relates to a method of punching statistical cards in which the capacity of the cards is increased by overpunching and which mainly consists in that the overpunching impulse when entered into a punching machine is stored in a memory of mechanical, electrical or other kind; that the overpunching operation is prepared by said impulse, and that thereafter the memory is released, whereafter the said operation is performed at a predetermined time. The advantages attained by this special method will be more fully understood by the following example:

A payment has been made on 12/30, the amount being £7639/17/11, and it has been effected by means of a transaction codified as No. 19. It is desired to register on a punched card amongst other data the following ones:

| Month | Day | Amount | | | Transaction |
|---|---|---|---|---|---|
| | | £ | sh. | p. | |
| 12 | 30 | 7639 | 17 | 11 | 19 |

By the use of overpunching this notation can be made on the card in eight columns. The two figures 1 and 2 denoting the month, are punched at the same time in the same column, the figure for the tens being converted to overpunching. In the same way the figures denoting the day, the amounts of shillings and of pence as well as the code number of the transaction, are punched. In order to punch the amount of pounds, containing four figures, in three columns only, the figure 7 for the thousands must be converted to an overpunching which, furthermore, must be delayed so that it is performed in the correct column. To realize such a delay manually is very difficult and introduces a considerable risk of errors. It has hitherto not been possible to perform this kind of punching by mechanical appliances.

A teleprinter tape containing the mentioned data carries the signals or combinations of perforations for the following consecutive figures:

1 2 3 0 7 6 3 9 1 7 1 1 1 9

If this series should be transferred from a tape to a punched card in an ordinary way one column must be used for each and every figure which means that in total 14 columns are required instead of 8 columns, if overpunching according to the invention is used.

By the method according to this invention the punching operator is relieved of the mental work of placing the overpunchings in the correct column. In the case of automatic tape-to-card converters the way is opened for utilizing overpunchings in order to increase the capacity of the cards.

The invention is more fully explained hereinafter in connection with the accompanying drawings illustrating as an example and in order to explain the various steps in the method a punching machine according to one form of the invention. The machine is based on the principle known per se, according to which a punch unit is operated by means of a set bar unit with latching pins and all latching pins required for the punching of a card are set up by the depression of keys in a keyboard or by means of a sensing device for a perforated tape, whereafter the entire card is punched by means of a special impulse.

FIG. 2 is a longitudinal section on the line II in FIG. 1, seen from the front side with certain parts removed in order to show a bellcrank for normal punching.

FIG. 3 is a similar longitudinal section of the carriage on the line III in FIG. 1 showing a bellcrank for overpunching.

FIG. 4 shows a device for the elimination of the action of an impulse to latch a latch pin.

FIG. 5 is a left hand view of a mechanical memory comprising a device for converting a normal punching to an overpunching.

FIG. 6 is a front elevation view of the same memory.

FIG. 7 is a front elevation of the carriage.

FIG. 8 is a rear elevation of the carriage showing the mechanism for moving the carriage step-by-step and also the device for delaying the overpunching.

FIG. 9 is a top view of the fore part of the carriage showing a stop mechanism.

FIG. 10a and 10b show two different kinds of riders for the stop mechanism.

FIG. 11 is a top view of the carriage corresponding to FIG. 8.

Figure 1:
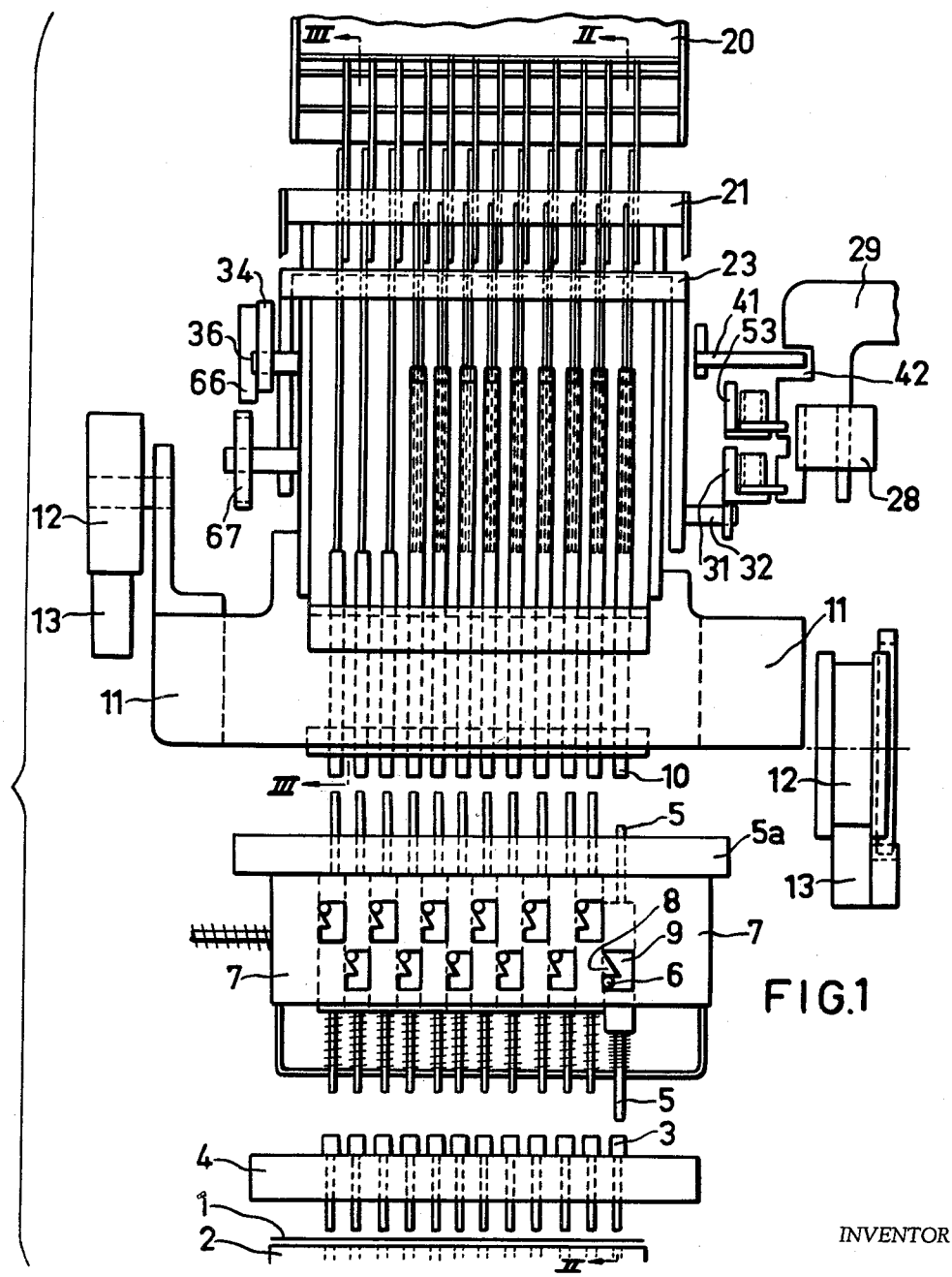
FIG. 1 is a left hand elevation view of a part of the machine showing a row of punches, a latching device, and a carriage with mechanism for actuating the latching device.

In FIG. 1 the card 1 rests upon a die 2. The punches 3 are arranged in rows, each comprising 12 punches suspended loosely by a stationary punch support 4. The number of rows of punches corresponds to the number of columns contained in the card.

A latching pin 5 is provided for each punch. These latching pins are movable in a stationary support 5a and are forced upwards by means of springs. Each pin is provided with a stud 6. When the pin 5 is depressed a corresponding latch bar 7, which is kept in its normal position by a spring, is displaced laterally by the stud actuating the latching projection 8 in a latching slot 9. In this way one or more latching pins can be locked or set in their lower position. One latching bar is provided for each row of latching pins or punches. FIG. 2, lower part, shows this latching device seen from the front, i.e. from the front end of the rows of punches.

When all required latching pins 5 have been latched in their lower position the punching operation is performed by raising the die 2 against the punch support 4. The locked punches penetrate the card, while all loose punches are lifted by the card. The selection of the latching pins 5 which have to engage the corresponding punches is performed by means of a device described below:

The machine is provided with a keyboard of a known type and design and therefore not shown on the drawings, and one key is provided for each one of the twelve positions pertaining to one column. When a key is depressed a corresponding ejector pin 10 moves the latching pin 5 downwards so that it becomes latched in its lower position. The twelve ejector pins 10 are arranged in a row and are supported by guides forming parts of the carriage 11 which is movable above the set bar unit containing the latching pins and the latching bars. The carriage runs on rollers 12 on rails 13 from one end of the card to the other across the columns. When a depressed key is again released the carriage is moved to the right one step corresponding to one column, see FIG. 2.

The ejector pins 10 for the FIGURES 1–9 are actuated by an equal number of bell cranks 14, whereas the pins 10 for the three overpunchings P, Q, and O are actuated in the same way by bell cranks 49 of modified design, FIG. 3. The bell cranks 14 are each provided with a movable selecting rod 15, pivoted on the lower, short arm of the bell crank. The nearly vertical, longer arm of the bell crank carries a pivoted driving plate 16 with three arms, one for a spring which keeps the plate in normal position, and the two others 17 and 18 provided with edges as shown in FIGURE 2.

When a key is depressed its movement is transmitted by means of a Bowden cable 19 in such a way that the plate 16 is turned counter-clockwise. Through this movement the edge of the arm 17 passes the edge of a flap 20 which thereby locks the plate in its turned position. At the same time the arm 18 with its edge 18a is turned downwards to ensure engagement with a setting member 21. On releasing the key a servomotor, not shown in the drawing, rocks the setting member to the left by means of the Bowden cable 22. This causes the bell crank 14 to turn counter-clockwise and actuate the ejector pin 10 and the latching pin 5. Thereafter the carriage is moved one step to the next column by the return motion of the key to its original position.

So far this description principally applies to the main features of a known design of punching machine provided with servomotor for obtaining a lighter touch of the keys, except that the movable selecting rods 15 are lacking, the lower part of all bell cranks being instead designed to actuate only the ejector pins 10 and not in the way described hereinafter.

If the punching of the card is to be performed according to this invention, a memory of some kind must be provided in order to receive certain impulses from the keyboard or the sensing mechanism for an indicator, such as a perforated tape or a magnetic tape, to convert these impulses to overpunchings and to release the stored impulses at the correct moment.

For this purpose the selecting rods 15 are carried by the lower, shorter arm of the bell cranks 14 in such a way that they can be turned through a certain angle by a switching member 23, this member being provided with one hole for each one of the selecting rods. Having been turned to the position shown by the dotted lines in FIG. 2 the selecting rods no longer actuate the ejector pins 10 but instead the memory pins 24. When a memory pin is depressed its corresponding memory lever 25 is turned downwards to its lower position by means of a stud 26 on the extension of the memory pin. In this position it is locked by the memory latch 27, thereby storing the impulse in the machine.

The abovementioned turning over of the selecting rods from the ejector pins to the memory pins is effected in the following way:

The machine is provided with a grooved bar 28, FIGS. 1 and 9, which is parallel to the rails 13 upon which the carriage runs. Movable riders or other stops 29 can be inserted in the grooves, which correspond to the columns of the card. The carriage is provided with an arresting member 30, FIGS. 7 and 9, carried by a slide 31. If a movable stop has been inserted in a certain groove corresponding to a certain column, this arresting member 30 will strike the stop when the carriage in its movement step-by-step arrives at that column. The slide 31 is thereby forced to the left. As it is connected by means of a pin 32 to the switching member 23 this member will be turned over to the position indicated by dotted lines in FIG. 7, whereby the memory pins 24 but not the ejector pins 10 (FIG. 2) will be actuated by the next impulse.

At the same time the mechanism for the step-by-step movement of the carriage in the right hand direction is disconnected. The movement of the carriage is effected in a known way by means of a spring under tension and a ratchet-wheel, not shown in the figures. The pawl of the ratchet-wheel is rocked by means of a movable lever 33 on the back of the carriage (FIG. 8) which, in turn, is actuated by the connecting rod 34. This rod is provided with a stud 35 engaging a vertical slot in the setting member 21 and is consequently moved each time the member is rocked. Through this device the step-by-step movement of the carriage is obtained.

The connecting rod 34 is swingably and slidably mounted on a pin 36 which is secured to the side wall of the carriage and is introduced into a slot at one end of the rod, see FIGS. 1, 8 and 11. The vertical position of the other end, which carries a catch 37 for engaging the rocking lever 33, is determined by a roller 38 on the switching member 23. When the member is in its normal position shown by full lines in FIG. 8 the catch 37 drives the rocking lever 33 and moves the carriage one step for each stroke of the setting member 21. When the switching member 23 is swung by means of the rider to the position shown with dotted lines in FIG. 8 the catch 37 is lowered so as to disengage the rocking lever 33 and no movement of the carriage can take place.

However, during the stroke of the setting member 21 the rider 29 has been lifted in the grooves of the bar 28 so that the arresting member 30 becomes free. The slide 31 and the switching member 23 return to their original positions. The lifting of the rider is accomplished by means of the knee lever 39, FIG. 7. At one end the lever carries a roller 40 which rests against the leg of the setting member 21. The other end is provided with a protrusion 41 arranged in such a way that it fits into a slot 42 of the rider 29, FIGS. 1, 10a and 10b.

The next impulse from the keyboard through the Bowden-cables 19 will cause the mechanism for locking the latching pins and moving the carriage to function in a normal way.

The preceding impulse has been stored in the memory as explained above when the corresponding memory lever 25 was locked in its lower position by the memory latch 27. Each one of the nine memory levers 25 is movable around a shaft 44 and actuates one of three converting arms 43, FIGS. 3, 5 and 6, which thereby are also turned around the shaft 44. The converting arms 43, representing the overpunchings P, Q and O, each have a connecting beam 46 extending across the pack of memory levers 25 and supported at the other end by the shaft 44. The connecting beams can be actuated by catches 45 on each one of the memory levers. In this way the converting arm for the overpunching "P" can be moved by the memory levers 25 corresponding to the figures "1," "4," and "7," the converting arm for the overpunching "Q" by the memory levers corresponding to the figures "2," "5," and "8," and, finally, the converting arm for the overpunching "O" by the memory levers corresponding to the figures "3," "6," and "9."

As will be seen from FIG. 3 the converting arms 43 transfer their movement by means of the link 43a to locking plates 47 which are movable on a shaft 47a. This shaft is supported by a column slide 48 movable in the longitudinal direction of the carriage. In FIG. 3 the slide is shown in its furthermost right-hand position.

Corresponding to the bell cranks 14 for the figures "1" to "9" there are, on the same shaft, three bell cranks 49 for the overpunchings "P," "Q," and "O." The lower, shorter arms of these bell cranks 49 lack selecting rods and each forms instead an integral part of the bell crank. The driving plates 50 are also modified, the arm 51 for the positioning spring having thus been extended to form a pawl resting against the locking plate 47. The edge 18a has, furthermore, been replaced by a movable edge 52.

This device operates in the following way:

When the memory lever 25 is being depressed by the actuation of the setting member 21 upon the bell crank 14 the corresponding converting arm 43 is turned to the vertical position indicated by dotted lines in FIG. 3. The locking plate 47 is thereby turned, and the driving plate 50 is simultaneously switched over to a position which corresponds to the position of the driving plates 16 in which they will be engaged by the setting member 21 in FIG. 2. As the memory lever 25 is being arrested by the memory latch 27, FIG. 2, both the locking plate 47 and the driving plate 50 are kept in their respective positions.

The setting member 21, in its rocking motion, carries with it the one of the three driving plates 50 which has been rotated and locked in position as aforesaid. During this stroke no setting of the latching pins 5 can be performed as the corresponding switching member has been turned to such a position, that the corresponding memory pin 24 is actuated instead of the ejector pin 10. However, if the extended program for overpunching up to 90 is to be used and the overpunching therefore has to be delayed to take place in a later column, one of the driving plates 50 will remain rotated and locked while the setting member 21 has to effectuate one or two ordinary punching operations. It must not be prevented from performing its rocking motion. This is the reason why the edge 52 has been made movable as indicated above. By its return to its right-most position the setting member 21 lifts the movable edge 52 which thereafter immediately returns to the position for engagement with the setting member. When the setting member is again rocked leftwards (counterclockwise) it engages the edge 52 so that the corresponding bell crank 49 is turned to the left. A condition for this function is, however, that the column slide 48 remains in its position so that the contact between the locking plate 47 and the driving plate 50 is maintained.

When the next stroke begins the device for moving the carriage is again operative. When the lever 33, FIG. 8, is rocked, it actuates the memory latch 27, FIG. 2, by means of a connecting link not shown in the drawing, so that the locked memory lever 25 returns to its upper, original position.

The procedure can now be repeated immediately. It is obvious that any number of stop members can be inserted in the grooves of the bar 28.

In case of numerical values only up to and including 39, thus consisting of one of two figures, the device described above can be used as being sufficient. In this simple case only the overpunchings "P"=10, "Q"=20, and "O"=30 are required which in the example referred to above will permit a notation of day, month, transaction, shillings, and pence in each column.

A limited use of overpunchings in the same column as the one in which the normal punching takes place, i.e. up to and including 39, is more frequently required and therefore more important than a further extended use of overpunchings according to which they are delayed and performed in a later column indicated in the opening paragraphs of the specification and as described more in detail below. When no delaying of the overpunching is required the mechanism is considerably simplified.

When using delayed overpunchings there appears a risk of errors through an unintentional punching in the position 0 of a column. How this risk can be eliminated will be shown hereinafter.

Above the slide 31 in FIGS. 7 and 9 another, similar but longer slide 53 is provided. This slide also carries an arresting member 54 which engages the stop member 29 in the same manner as the arresting member 30 does. If both the arresting members 30 and 54 are to be used the stop member must be given the shape as shown at 29a, FIG. 10a. The slot 55 permits the arresting member 54 to pass once the movable stop has been lifted.

The slide 53 is provided with a rack on its extreme right-hand end, which rack engages a toothed sector 56 on a shaft 57, and a lever 58 on the other end of this shaft, FIG. 8, actuates a push rod 59. By means of this rod the nipple 60 for the Bowden-cable 19a, FIG. 4, can be swung around the shaft 61, the Bowden-cable being the one which actuates the driving plate 50a for the figure "0," also being the overpunching "0."

When the slide 53, FIG. 7, is moved to the left relative to the carriage by the stop member this movement is transmitted by means of the rack and the toothed sector 56 through the lever 58 and the push rod 59, FIG. 8, to the nipple 60, FIG. 4, which is raised so that the fore end of the Bowden-cable, on receiving an impulse, penetrates into the slot 63 of the driving plate 50a. As the plate thus remains in its position an engagement with the setting member 21 is prevented and no setting of a latching pin 5 will be performed, although an impulse has been received by the machine.

In order to enter a number containing four figures into only three columns overpunchings carrying a higher value than 30 are required as has explained above. In the second column overpunchings for 40, 50 and 60 are performed, and in the third column overpunchings for 70, 80, and 90. When entering four-figure numbers the overpunchings in reality will stand for 1000, 2000, 3000, etc., but the commonly accepted way of indicating their values with two figures only has been used here.

With the object of making possible a programing of the overpunchings, i.e. their distribution or displacement to the proper column, the locking plates 47, FIG. 3, are provided on the movable column slide 48. If the slide is moved to the left the contact between the locking plate 47 and the driving plate 50 with the arm 51 is interrupted. The plates 50 are thus disengaged and will not be actuated although an impulse may have been stored and converted by the memory as already has been described.

The slide 48 rests by means of a protrusion 64, FIG. 8, and a spring not shown in the drawing against the leg of the setting member 21 in its left end position and can be moved by said member to the right against the tension of this spring. Its return motion to the left, however, can be barred by a time disc 65 secured to the shaft 72 and shown by dotted lines. The time disc is provided with perpheral slots for a protrusion 48a on the slide, see also FIG. 11. The movement of the time disc is effected by means of a ratchet-wheel 67 which can be turned step by step by the pawl 66 on the connecting rod 34. The ratchet-wheel has three teeth for turning the time disc one step and another three teeth for turning it two steps. When the connecting rod makes one stroke the turning angle of the ratchet-wheel depends upon the original position of the wheel, and this position depends, in turn, upon the overpunching which is desired. If an overpunching of 40, 50, or 60 is desired it must be performed according to the schedule given above as an example, i.e. in that column which follows the column in which the operation of the device described has started. The overpunchings 70, 80, and 90 must be made in the third column. This is accomplished by turning the time disc 65 to the right or to the left depending upon which series of overpunchings 40, 50, 60 or 70, 80, 90 contains the one to be punched in the card. The device for turning the time disc will now be described.

The memory pins 24, FIG. 2, are each provided with an upper extension carrying a catch 68, and two groups each comprising three catches each actuates one of two positioning slides 69, see FIGS. 2, 3, and 11. Each positioning slide is provided with a pawl 70 which moves an individual one of two ratchet-wheels 71 on the shaft 72 step by step in such a way that the wheels rotate in opposite directions.

By this device such a positioning of the ratchet-wheel 67 is attained that the movement of the column slide 48 is determined by the impulse received by the machine and converted to an overpunching according to a predetermined schedule. When the movement of the column slide takes place a lever, not shown in the drawing, actuates the memory latch 27 in order to release the memory lever 25 which in its locked position caused the overpunching.

If the position "0" is to be used for overpunchings representing 30, 60, and 90 all impulses corresponding to the figure 0 must be prevented from actuating the latching pins. This is accomplished by the mechanism already described, but it is, of course, necessary to insert a rider in each column in which an elimination of the figure 0 is required. This rider, however, must not actuate the switching member 23, FIG. 2, except in the first one of the three columns in which the number containing four figures is to be recorded. The stop member for the second and third column must, accordingly, have a form such as that shown by 29b in FIG. 10b.

As explained above with reference to the embodiment shown in the drawings the method for punching statistical cards with overpunching for increasing the record capacity of the cards can be utilized in a practical and advantageous way by means of mechanical appliances according to the invention, whereas, hitherto, the said use of overpunching as far as known has been used in connection with an automatic transfer of the data contained in the original documents such as a perforated tape or the like, but not in connection with the code of the international teleprinter system.

The device for converting the impulses can be varied according to the requirements of the punching system. It can, for instance, easily be adapted for converting to the known 1—2—4—8 system with each column containing 12 positions divided into three sections.

The method of storing in a memory, converting and releasing the impulses received according to the invention is not restricted to the use of mechanical means, as obviously any electro-magnetic, electronic or similar kind of device may be used with advantage for the purpose of effecting the functions referred to.

It is, furthermore, evident that this method is applicable also to such punched card systems where the card is punched column by column instead of being punched completely at one time after a previous setting of the punch mechanism. The difference consists principally in that the card is moved instead of the carriage carrying the latching device. Thus the carriage to be used forms a carrier for the card which is moved step by step whereby column after column is passed over a row of punches, actuated by a mechanical, electrical, or other suitable device.

What I claim is:

1. In a machine for punching data in columns of statistical cards, at least one row of punches for ordinary punching as well as overpunching operations in response to input impulses; a die for performing punching and overpunching simultaneously; a support bar extending transversely to said row of punches and carrying a plurality of stop members fastened to said support bar in selected locations; and a carriage movable along said support bar and having an operating mechanism comprising a memory with a row of storage elements, corresponding in number to the number of punches for ordinary punching operations, for storing input impulses, a row of punch actuating members, corresponding in number to the number of punches of one row and each being alignable with its respective punch, a row of switch members for transmitting input impulses, when in one working position, to the member actuating the punches for ordinary punching and, when in a second working position, to the storage elements of the memory, means for shifting said switch members from the position for ordinary punching to the position for overpunching in response to the impact of said shifting means on one of said stop members provided on said support bar, a converting device connected with the memory, for preparing the overpunching operation in response to those storage elements storing overpunching input impulses, and a transmission device for transmitting impulses received by the storage elements of the memory therefrom to the members for actuating the punches for overpunching through said converting device.

2. In a machine for punching data in columns of statistical cards, at least one row of punches for ordinary punching as well as overpunching operations in response to input impulses; a die cooperating with said punches and forming a base for the statistical card to be punched; a memory device having a row of storage elements for storing input impulses, said storage elements corresponding in number to the number of punches for ordinary punching operation of one row; a support bar which extends transversely to said row of punches and is adapted to receive a plurality of stop members selectively positionable in said bar; and a carriage movable in a path extending along said support bar and having a plurality of punch actuating members corresponding in number to the number of punches in one row, a row of switch members for transferring, in cooperation with the stop members, the influence of said input impulses from said punch actuating members to said storage elements of the memory device.

3. A device according to claim 2 and comprising a timer for control of the members actuating the punches for overpunching and for displacing the overpunching in the direction of movement of said carriage with respect to corresponding ordinary punching.

4. A device according to claim 3 and a device for receiving and introducing in the machine an impulse for a figure position and an arresting member for switching over said device from a position, in which said device receives and introduces the impulse to another position in which the impulse is received but is prevented from actuating the corresponding punch.

5. A device as claimed in claim 3, and a memory locking device, for emptying and restoring the storage elements of the memory device to their initial positions after that an impulse stored in the memory device and converted to an overpunching has been recorded in the statistical card.

6. A device according to claim 3 in which said storage elements are provided in the carriage.

References Cited in the file of this patent

UNITED STATES PATENTS

| | | |
|---|---|---|
| 1,969,332 | Smith et al. | Aug. 7, 1934 |
| 2,213,184 | Andrews | Sept. 3, 1940 |
| 2,716,453 | Johnson et al. | Aug. 30, 1955 |
| 2,749,985 | Johnson | June 12, 1956 |